Figure 1:
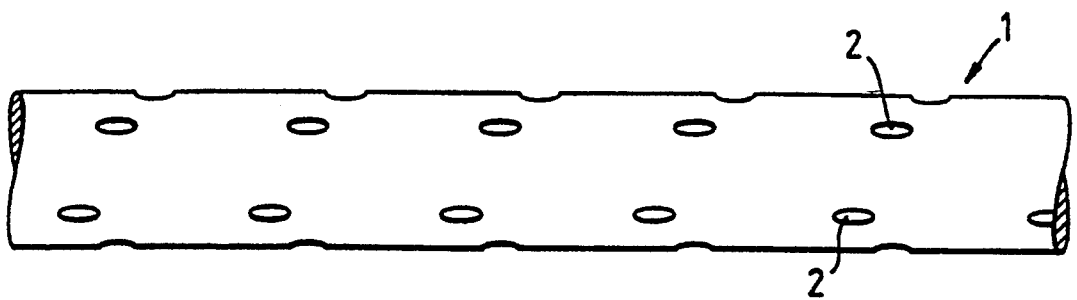

United States Patent [19]

Downie et al.

[11] Patent Number: 5,430,255
[45] Date of Patent: Jul. 4, 1995

[54] ELECTRIC WIRES AND CABLES AND CONDUCTORS FOR USE IN THEM

[75] Inventors: Ian G. Downie; John W. Playford, both of Brockville, Canada

[73] Assignee: Phillips Cables Limited, Ontario, Canada

[21] Appl. No.: 200,694

[22] Filed: Feb. 23, 1994

[30] Foreign Application Priority Data

Feb. 23, 1993 [GB] United Kingdom ............... 9303618

[51] Int. Cl.$^6$ .............................. H01B 7/00
[52] U.S. Cl. ................. 174/110 R; 29/825; 156/50; 156/51; 174/126.1; 174/126.3; 174/130
[58] Field of Search ...... 174/110 R, 110 SR, 110 PM, 174/126.1, 126.3, 130; 156/50, 51; 29/825; 427/118

[56] References Cited

U.S. PATENT DOCUMENTS

| Re. 27,830 | 12/1973 | Schoerner | 174/128.1 |
| 4,360,395 | 11/1982 | Suzuki | 156/54 |
| 4,427,469 | 1/1984 | Swartz et al. | 156/50 |
| 4,463,219 | 7/1984 | Sato | 174/127 |
| 4,687,884 | 8/1987 | DeHart | 174/130 |
| 5,339,058 | 8/1994 | Lique | 333/237 |

FOREIGN PATENT DOCUMENTS

| 54-158680 | 12/1979 | Japan . |
| 57-138713 | 8/1982 | Japan . |
| 2175125 | 11/1986 | United Kingdom . |

*Primary Examiner*—Morris H. Nimmo
*Attorney, Agent, or Firm*—Oliff & Berridge

[57] ABSTRACT

An electric wire or cable having at least one aluminum conductor with extruded insulation with or without a semiconducting extruded screen or screens has the surface of the metallic conductor textured to provide a mechanical interlock with extruded material applied closely to it. This reduces the effect of shrink-back when the wire or cable is cut back for termination or jointing, and may thus allow faster extrusion in manufacture.

5 Claims, 1 Drawing Sheet

ELECTRIC WIRES AND CABLES AND CONDUCTORS FOR USE IN THEM

This invention relates to electric wires and cables (both hereinafter for brevity included in the term line) having at least one aluminum conductor with extruded insulation, whether of thermoplastic or elastomeric materials and with or without semiconducting extruded screens, and includes insulated aluminum conductors for use in such lines.

The insulation (and screens) of such lines inevitably has residual stresses arising from the extrusion process, and there is a much greater tendency, compared with lines with copper conductors, for the cut end of the extruded portion to "shrink back" when the end of the line is cut for the purpose of terminating or jointing the line, leaving an unpredictable length of the conductor of the line exposed. The faster the extrusion process, the greater the extent of shrink-back experienced, and in some cases the avoidance of excessive shrink-back may be the requirement that limits manufacturing speed and thus machine utilisation.

This invention provides aluminum-conductor lines in which the tendency for shrink-back to occur is reduced and which can therefore, in at least some cases, be produced more rapidly and economically than conventional aluminum-conductor lines.

In accordance with the invention, the surface of the said aluminum conductor is textured to provide a mechanical interlock with extruded material applied closely to it.

By "textured" is meant that the surface is not flat or uniformly curved but has depressed or raised areas (or both) distributed over its area. Depressed areas are preferred. Preferably the depressed or raised areas are discrete areas small compared with the cross-section of the conductor, and more particularly areas that extend continuously along the length of the conductor (whether parallel to its axis, helically or in some more complex way) are preferably avoided, as they might create opportunities for migration of moisture or other undesirable materials.

Preferably the distribution of depressed or raised areas is uniform, at least in the longitudinal direction of the conductor.

Preferably the surface is textured by causing the aluminum to flow plastically, for example by contacting it with complementarily textured rolls under sufficient pressure.

Preferably the texture is without sharp edges that might be mechanically or electrically weak. More especially, we prefer a texture formed by a regular pattern of discrete smooth dimples arranged in lines parallel to the axis of the conductor. The individual dimples may be circular in plan or may be elongate, preferably with their long axes perpendicular to the conductor axis. Other shapes are possible, but are not seen as having particular advantages.

Figure 2:
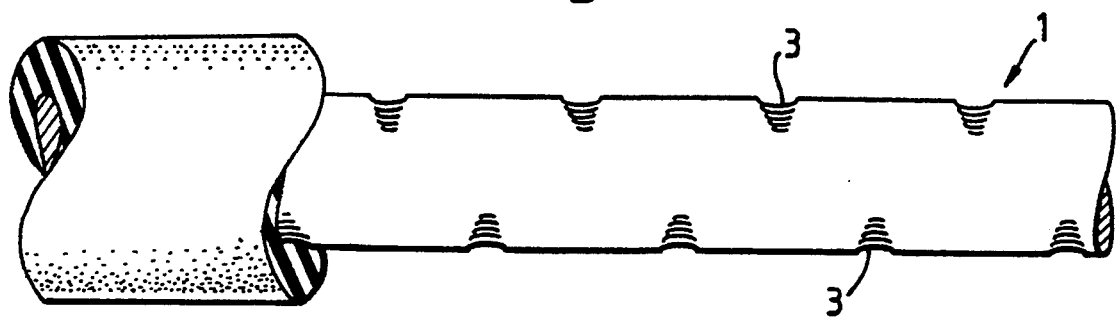
Figure 3:
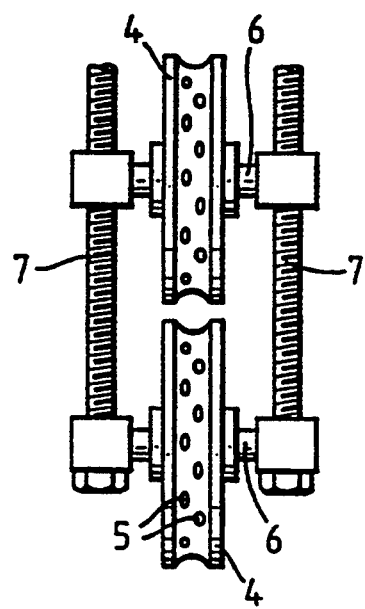

The invention will be further described, by way of example, with reference to the accompanying drawings in which:

FIGS. 1 and 2 are sketches of two forms of conductor for use in an insulated wire or cable in accordance with the invention and FIG. 3 is a diagram of apparatus for making the conductor of FIG. 1.

The conductor 1 of FIG. 1 is a conventional aluminum conductor of circular cross section and its surface is textured by depressions 2 indented into it in any convenient pattern distributed over most of its surface. For example, for a #2AWG conductor (6.5 mm in diameter) a pattern consisting of six equally spaced longitudinal rows of smooth oval depressions each 0.08 inches (2 mm) long by 0.06 inches (1.5 mm) wide and with a maximum depth of 0.003 inches (0.08 mm) is considered suitable.

FIG. 2 shows an alternative design of conductor in which the texture is formed by two rows of depressions, each elongate in the circumferential direction and extending around approximately a quarter of the circumference of the conductor.

FIG. 3 shows apparatus suitable for mounting between the conductor pay-off of an extrusion line and the inlet of the extruder, allowing texture to be applied to the conductor with negligible running cost. It comprises a pair of textured rolls 4,4 which are complementary to the desired texture pattern of the conductor, having raised areas 5 corresponding to the dimples 2 seen in FIG. 1. The rolls 4,4 are mounted on spindles 6 and adjusting screws 7 are provided to allow adjustment of contact pressure and thus of texture depth; the extent of adjustment available may be sufficient to allow use on a range of conductor sizes, within the limits set by the need for reasonable conformity between the curvatures of the rolls and of the conductor surface.

It will be appreciated that certain parts of the circumference of the conductor cannot be textured by a single pair of rolls. Complete circumferential texturing is not considered necessary, but if desired a second pair of rolls at right angles (or some other convenient angle) to the first could be used to achieve it.

We claim:

1. An insulated electric line having at least one aluminum conductor with extruded insulation characterised in that the surface of the said metallic conductor is textured to provide a mechanical interlock with extruded material applied closely to it.

2. An electric line as claimed in claim 1 in which said surface is textured by the presence of areas selected from raised areas and depressed areas.

3. An electric line as claimed in claim 1 in which said surface is textured by discrete areas selected from depressed areas and raised areas, said areas being small compared with the cross-section of the conductor.

4. An electric line as claimed in claim 3 in which the distribution of said areas is uniform in the longitudinal direction of the conductor.

5. An electric line as claimed in claim 4 in which the texture is formed by a regular pattern of discrete smooth dimples arranged in longitudinal lines.

* * * * *